United States Patent
Park

(10) Patent No.: US 8,267,537 B2
(45) Date of Patent: Sep. 18, 2012

(54) BACKLIGHT UNIT AND DISPLAY DEVICE HAVING THE SAME

(75) Inventor: Jun Seok Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 332 days.

(21) Appl. No.: 12/521,490

(22) PCT Filed: Dec. 21, 2007

(86) PCT No.: PCT/KR2007/006719
§ 371 (c)(1),
(2), (4) Date: Jun. 26, 2009

(87) PCT Pub. No.: WO2008/082112
PCT Pub. Date: Jul. 10, 2008

(65) Prior Publication Data
US 2010/0039798 A1    Feb. 18, 2010

(30) Foreign Application Priority Data

Dec. 29, 2006  (KR) .................. 10-2006-0138965

(51) Int. Cl.
*G02F 1/13357* (2006.01)
(52) U.S. Cl. ............... 362/97.3; 362/97.1; 362/97.2; 362/97.4; 362/249.02
(58) Field of Classification Search ............ 362/249.02, 362/97.1–97.3
See application file for complete search history.

(56) References Cited

U.S. PATENT DOCUMENTS

| | | | |
|---|---|---|---|
| 6,411,353 B1 | 6/2002 | Yarita et al. | |
| 7,324,174 B2 | 1/2008 | Hafuka et al. | |
| 7,578,610 B2 | 8/2009 | Sakamoto et al. | |
| 7,699,484 B2 * | 4/2010 | Teng | 362/97.3 |
| 7,780,312 B2 | 8/2010 | Han et al. | |
| 7,878,680 B2 | 2/2011 | Fujino et al. | |
| 2005/0018102 A1 | 1/2005 | Hirano | |
| 2005/0088586 A1 | 4/2005 | Mori et al. | |
| 2005/0088830 A1 | 4/2005 | Yumoto et al. | |
| 2006/0103776 A1 | 5/2006 | Park et al. | |
| 2006/0279946 A1 | 12/2006 | Park et al. | |
| 2007/0103908 A1 | 5/2007 | Tabito et al. | |
| 2007/0211205 A1 | 9/2007 | Shibata | |
| 2007/0230206 A1 * | 10/2007 | Hsiao et al. | 362/560 |
| 2007/0247869 A1 | 10/2007 | Lang et al. | |
| 2008/0123369 A1 * | 5/2008 | Lee | 362/633 |
| 2010/0026928 A1 * | 2/2010 | Park | 349/61 |
| 2010/0290212 A1 * | 11/2010 | Francis | 362/97.3 |

FOREIGN PATENT DOCUMENTS

| | | |
|---|---|---|
| JP | 2005-108519 A | 4/2005 |
| JP | 2005-134422 A | 5/2005 |
| JP | 2005-283825 A | 10/2005 |
| JP | 2005-353498 A | 12/2005 |
| JP | 2006-049098 A | 2/2006 |

(Continued)

*Primary Examiner* — Stephen F Husar
*Assistant Examiner* — James Cranson, Jr.
(74) *Attorney, Agent, or Firm* — Birch, Stewart, Kolasch & Birch, LLP

(57) ABSTRACT

Disclosed are a backlight unit and a display device having the same. The backlight unit comprises a light emitting diode (LED) module comprising an LED, a case supporting the LED module and comprising a bending part that guides and fixes an end portion of the LED module, and a fixing part fixing the LED module to the case.

20 Claims, 3 Drawing Sheets

FOREIGN PATENT DOCUMENTS

| | | |
|---|---|---|
| JP | 2006-49098 A | 2/2006 |
| JP | 2006-58487 A | 3/2006 |
| JP | 2006-338020 A | 12/2006 |
| JP | 2006-339004 A | 12/2006 |
| JP | 2006-349796 A | 12/2006 |
| JP | 3128234 U | 12/2006 |
| JP | 2007-194067 A | 8/2007 |
| JP | 2007-250276 A1 | 9/2007 |
| JP | 2007-265646 A | 10/2007 |
| JP | 2008-028171 A | 2/2008 |
| KR | 2000-0073646 A | 12/2000 |
| KR | 1020050028868 A | 3/2005 |
| KR | 10-2006-0063023 A | 6/2006 |
| WO | WO 2005/114273 | 12/2005 |

* cited by examiner

[Fig. 1] Conventional Art
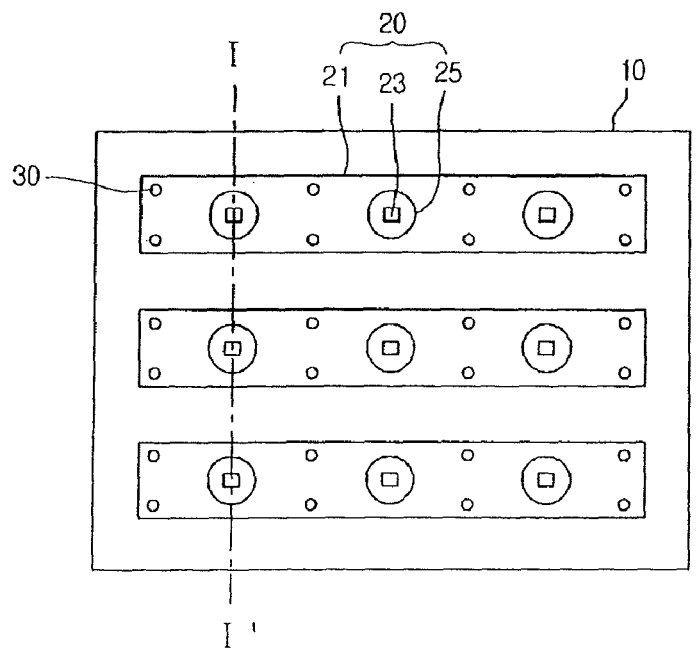
[Fig. 2] Conventional Art
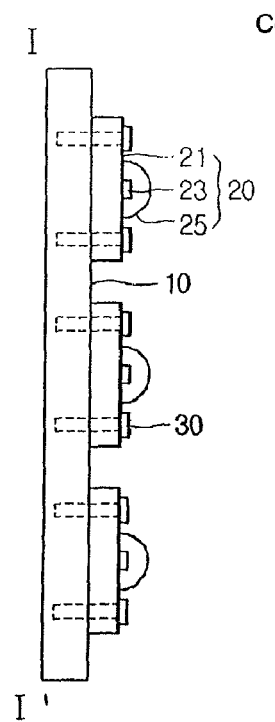

[Fig. 3]
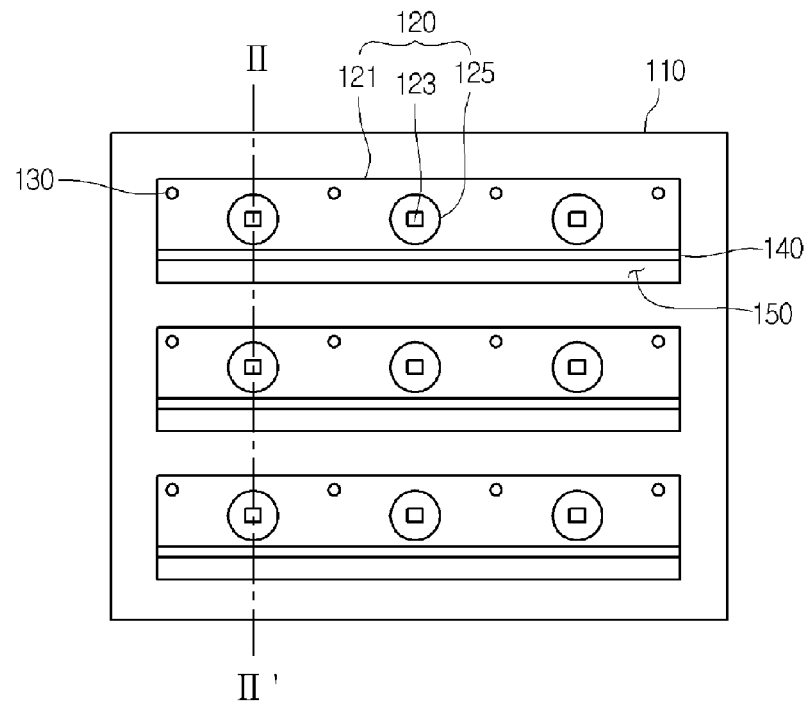
[Fig. 4]
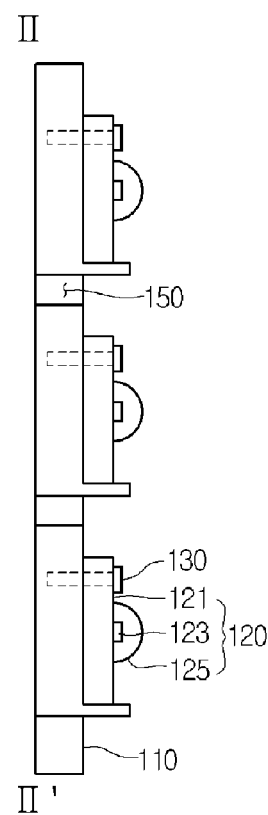

[Fig. 5]
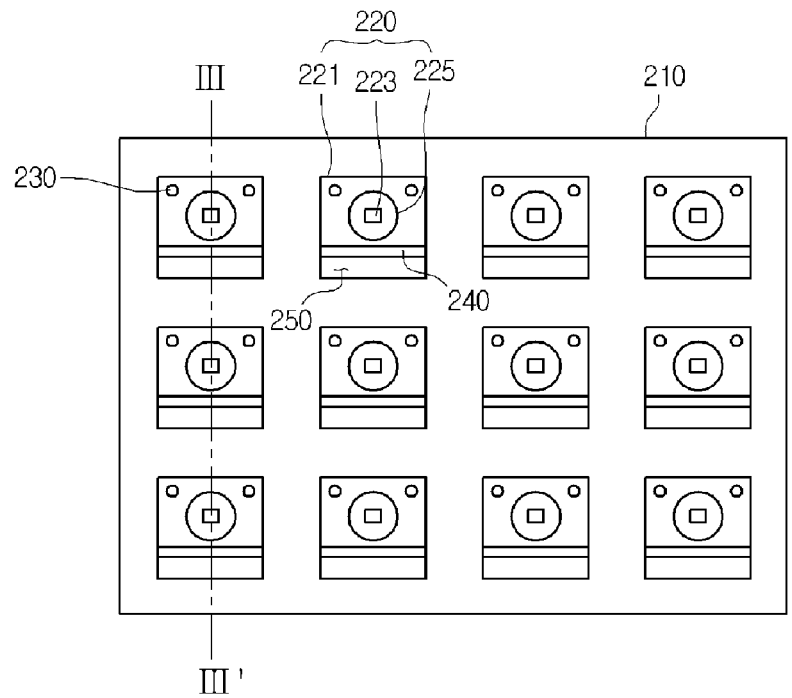
[Fig. 6]
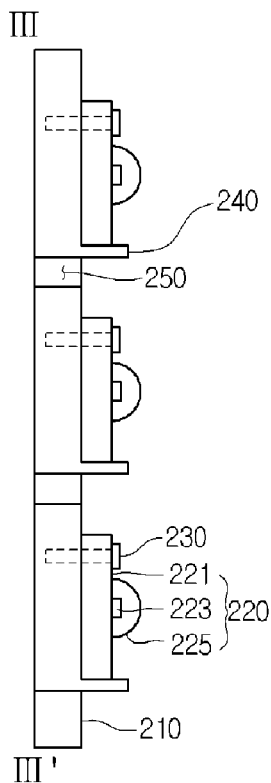

BACKLIGHT UNIT AND DISPLAY DEVICE HAVING THE SAME

TECHNICAL FIELD

The embodiment relates to a backlight unit and a display device having the same.

BACKGROUND ART

FIG. 1 is a schematic view showing a portion of a conventional backlight unit, and FIG. 2 is a sectional view taken along line I-I' of FIG. 1.

As shown in FIGS. 1 and 2, the related art backlight unit comprises a case 10, an LED module 20, and a fixing part 30.

The LED module 20 for providing light comprises a printed circuit board 21, a light emitting diode (LED) 23 formed on the printed circuit board 21, and a mold part 25 formed on the LED 23. A reflective sheet having an opening is formed on the LED module 20 such that the LED 23 is exposed. The reflective sheet reflects light emitted from the LED 23 upward.

The fixing part 30 fixes the LED module 20 to the case 10. The case 10 may be a cover bottom. For example, the fixing part 30 comprises a screw. The backlight unit having the above structure has a plurality of LED modules 20.

Meanwhile, the defects of the LED modules 20 may be detected during an inspection process for product release. When detecting the defects of the LED modules 20 as described above, the case 10 must be disassembled and the fixing parts 30 must be separated from the LED modules 20 in order to replace the LED modules 20 with new ones. However, in order to disassemble the case 10 and separate the LED modules 20 from the case 10, it is inconvenient in that many fixing parts 30 must be separated from the LED modules 20 as shown in FIGS. 1 and 2. In addition, after the produce release, a user may have to replace the LED modules 20 with new ones due to the occurrence of the defects of the LED modules 20 in use.

Accordingly, a backlight unit, in which the LED module 20 can be easily separated from the case 10 and replaced with new ones, is required.

DISCLOSURE OF INVENTION

Technical Problem

The embodiment provides a backlight unit and a display device having the same, in which parts can be easily replaced with new ones.

Technical Solution

According to the embodiment, a backlight unit comprises a light emitting diode (LED) module comprising an LED; a case supporting the LED module, and comprising a bending part that guides and fixes an end portion of the LED module; and a fixing part fixing the LED module to the case.

According to the embodiment, a display device comprises a backlight unit comprising a light emitting diode (LED) module comprising an LED, a case supporting the LED module, and comprising a bending part that guides and fixes an end portion of the LED module; and a fixing part fixing the LED module to the case; and a display part displaying an image.

Advantageous Effects

In a backlight unit and a display device having the same according to the embodiment, parts thereof can be easily replaced with new ones.

BRIEF DESCRIPTION OF THE DRAWINGS

FIG. 1 is a schematic view showing a portion of a conventional backlight unit.

FIG. 2 is a sectional view taken along line I-I' of FIG. 1.

FIG. 3 is a schematic view showing a portion of a backlight unit according to the embodiment.

FIG. 4 is a sectional view taken along line II-II' of FIG. 3.

FIG. 5 is a schematic view showing a backlight unit according to another embodiment.

FIG. 6 is a sectional view taken along line III-III' of FIG. 5.

MODE FOR THE INVENTION

In the description of an embodiment, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present.

Hereinafter, the embodiment will be described with reference to accompanying drawings.

FIG. 3 is a schematic view showing a portion of a backlight unit according to the embodiment, and FIG. 4 is a sectional view taken along line II-II' of FIG. 3.

As shown in FIGS. 3 and 4, the backlight unit according to the embodiment comprises a case 110, an LED module 120, a fixing part 130, and a bending part 140.

The LED module 120 for providing light comprises a printed circuit board 121, a light emitting diode 123 formed on the printed circuit board 121, and a mold part 125 formed on the LED 123. The LED 123 can be mounted on the printed circuit board 121.

The LED module 120 may be formed as the plural number, and at least one LED module 120 comprises a plurality of LEDs. And the LED module 120 may be formed as the plural number, and each LED module 120 comprises an LED.

A reflective sheet having an opening is formed on the LED module 120 such that the LED 123 can be exposed. The reflective sheet reflects light emitted from the LED 123 upward.

The case 110 supports the LED module 120, and is formed with a bending part 140 for guiding and fixing an end portion of the LED module 120. The bending part 140 has the same length as that of the LED module 120 and is located corresponding to a fixing position of the LED module 120. The bending part 140 has a length longer than or shorter than a length of the LED module 120. The bending part 140 may be formed by bending an area corresponding to an opening 150 of the case 110. The case 110 may be formed of a Steel Use Stainless (SUS) material. The bending part 140 may be integrated with the case 110 in the manufacturing process of the case 110.

The fixing part 130 fixes the LED module 120 on the case 110. The case 110 may be cover bottom. The fixing part 130 may be formed as a screw, a nail. The fixing part 130 can be inserted into the case 110, or can extend by passing through the case 110. The coupling position of the fixing part 130 may be variously changed according to the design of the backlight unit.

In this case, in the backlight unit according to the embodiment, the fixing part 130 fixes the LED module 120 to the case 110 such that the fixing part 130 is coupled to the LED module 120 in another end area of the LED module 120 in which the bending part 140 is not formed.

In the backlight unit according to the embodiment, the LED module 120 may be fixed onto the case 110 by the fixing part 130 and the bending part 140 formed at the first end of the LED module 120. Accordingly, when comparing the backlight unit with the conventional backlight unit as shown in FIGS. 1 and 2, the number of the fixing parts 130 may be remarkably reduced, so that the LED module 120 may be more simply separated from the case 110.

As described above, in the backlight unit according to the embodiment, the LED module 120 may be easily separated from the case 110 and replaced.

The backlight unit having the above structure comprises a plurality of LED module 120. The number of the LED modules 120 may be variously changed according to an example in which the backlight unit is employed. In addition, the LED modules 120 may be variously arranged.

Although the bending part 140 may be integrated with the case 110 as described above, the bending part 110 may be formed as a separated member.

The backlight unit according to the embodiment may be employed for various display devices requiring a light source. For example, the backlight unit may be adopted for a liquid crystal display equipped with a liquid crystal panel. The liquid crystal display displays an image on a display part of the liquid crystal panel by using light emitted from the backlight unit.

Meanwhile, FIG. 5 is a schematic view showing a backlight unit according to another embodiment, and FIG. 6 is a sectional view taken along line III-III' of FIG. 5.

As shown in FIGS. 5 and 6, the backlight unit according to the embodiment comprises a case 210, an LED module 220, a fixing part 230, and a bending part 240.

The LED module 220 for providing light comprises a printed circuit board 221, a light emitting diode 223 formed on the printed circuit board 221, and a mold part 225 formed on the LED 223. The LED 123 can be mounted on the printed circuit board 121.

The LED module 220 may be formed as the plural number, and each LED module 220 comprises an LED such as the FIG. 5. Also the LED module 220 may be formed as the plural number, and at least one LED module 220 comprises a plurality of LEDs.

A reflective sheet having an opening is formed above the LED module 220 such that the LED 223 can be exposed. The reflective sheet reflects light emitted from the LED 223 upward.

The case 210 supports the LED module 220, and is formed with a bending part 240 for guiding and fixing one end portion of the LED module 220. The bending part 240 has a length shorter than that of the LED module 220 and is located corresponding to a position in which the LED module 220 is fixed. The bending part 140 has a length longer than or substantially identical to a length of the LED module 120. The bending part 240 may be formed by bending an area corresponding to the opening 250 of the case 210. The bending part 240 comprises at least one bent area such that the LED module 220 is stably fixed. The case 210 may be formed of a SUS material, and the bending part 240 may be integrated with the case 210 in the manufacturing process of the case 210.

The fixing part 230 fixes the LED module 220 on the case 210. The 210 may be cover bottom. The fixing part 230 may be formed as a screw, a nail. In the FIG. 5, the fixing part 230 comprises two screws per one LED module. The fixing part 230 can be inserted into the case 210, or can extend by passing through the case 210. The coupling position of the fixing part 230 may be variously changed according to the design of the backlight unit.

In this case, in the backlight unit according to the embodiment, the fixing part 230 fixes the LED module 220 to the case 210 such that the fixing part 230 is coupled to the LED module 220 in another end area of the LED module 220 in which the bending part 240 is not formed.

In the backlight unit according to the embodiment, the LED module 220 may be fixed onto the case 210 by the fixing part 230 and the bending part 240 formed at the first end of the LED module 220. Accordingly, when comparing the backlight unit with the conventional backlight unit as shown in FIGS. 1 and 2, the number of the fixing parts 230 may be remarkably reduced, so that the LED module 220 may be more simply separated from the case 110.

As described above, in the backlight unit according to the embodiment, the LED module 220 may be easily separated from the case 210 and replaced.

The backlight unit having the above structure comprises a plurality of LED module 220. The number of the LED modules 220 may be variously changed according to an example employing the backlight unit. In addition, the LED modules 220 may be variously arranged.

Although the bending part 240 may be integrated with the case 210 as described above, the bending part 210 may be formed as a separated member.

The backlight unit according to the embodiment may be employed for various display devices requiring a light source. For example, the backlight unit may be adopted for a liquid crystal display equipped with a liquid crystal panel. The liquid crystal display displays an image on a display part of the liquid crystal panel by using light emitted from the backlight unit.

Any reference in this specification to "one embodiment", "an embodiment", "example embodiment", etc., means that a particular feature, structure, or characteristic described in connection with the embodiment is comprised in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Industrial Applicability

As described above, in a backlight unit and a display device having the same, parts can be easily replaced.

The invention claimed is:

1. A backlight unit comprising:
   a light emitting diode (LED) module comprising an LED;
   a case supporting the LED module, and comprising a bending part that guides and fixes an end portion of the LED module; and
   a fixing part fixing the LED module to the case.

2. The backlight unit as claimed in claim 1, wherein the LED module comprises a printed circuit board, the LED on the printed circuit board, and a mold part on the LED.

3. The backlight unit as claimed in claim 1, wherein the bending part has a length substantially identical to or shorter than a length of the LED module, and is located corresponding to a fixing position of the LED module.

4. The backlight unit as claimed in claim 1, wherein the bending part comprises at least one bent area formed corresponding to a fixing position of the LED module.

5. The backlight unit as claimed in claim 1, wherein the case is formed of a Steel Use Stainless (SUS) material.

6. The backlight unit as claimed in claim 1, comprising a reflective sheet on the LED module comprising an opening such that the LED is exposed.

7. The backlight unit as claimed in claim 6, wherein the reflective sheet reflects light emitted from the LED upward.

8. The backlight unit as claimed in claim 1, wherein the fixing part fixes the LED module to the case in another end area of the LED module in which the bending part is not formed.

9. The backlight unit as claimed in claim 1, wherein the bending part is integrated with the case.

10. The backlight unit as claimed in claim 1, wherein the bending part is formed with a member separated from the case.

11. The backlight unit as claimed in claim 1, wherein the LED module is formed as the plural number, and at least one LED module comprises a plurality of LEDs.

12. The backlight unit as claimed in claim 1, wherein the LED module is formed as the plural number, and each LED module comprises an LED.

13. A display device comprising:
    a backlight unit comprising a light emitting diode (LED) module comprising an LED, a case supporting the LED module, and comprising a bending part that guides and fixes an end portion of the LED module; and a fixing part fixing the LED module to the case; and
    a display part displaying an image.

14. The display device as claimed in claim 13, wherein the display part is a liquid crystal panel.

15. The display device as claimed in claim 13, wherein the LED module comprises a printed circuit board, the LED on the printed circuit board, and a mold part on the LED.

16. The display device as claimed in claim 13, wherein the bending part has a length identical to or shorter than a length of the LED module, and is located corresponding to a fixing position of the LED module.

17. The display device as claimed in claim 13, wherein the bending part comprises at least one bent area formed corresponding to a fixing position of the LED module.

18. The display device as claimed in claim 13, comprising a reflective sheet on the LED module comprising an opening such that the LED is exposed.

19. The display device as claimed in claim 13, wherein the fixing part fixes the LED module to the case in another end area of the LED module in which the bending part is not formed.

20. The display device as claimed in claim 13, wherein the bending part is formed integrally with or separately from the case.

* * * * *